Oct. 18, 1966  V. F. KRAHN ETAL  3,279,589
FORAGE HARVESTER
Filed Oct. 20, 1964  2 Sheets-Sheet 1
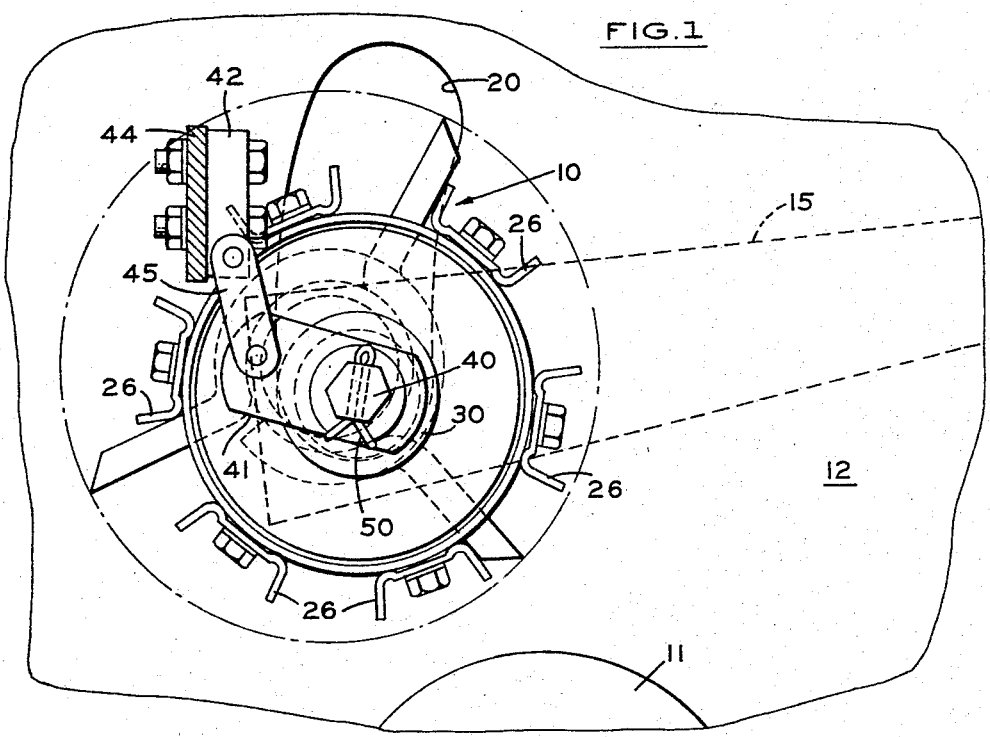
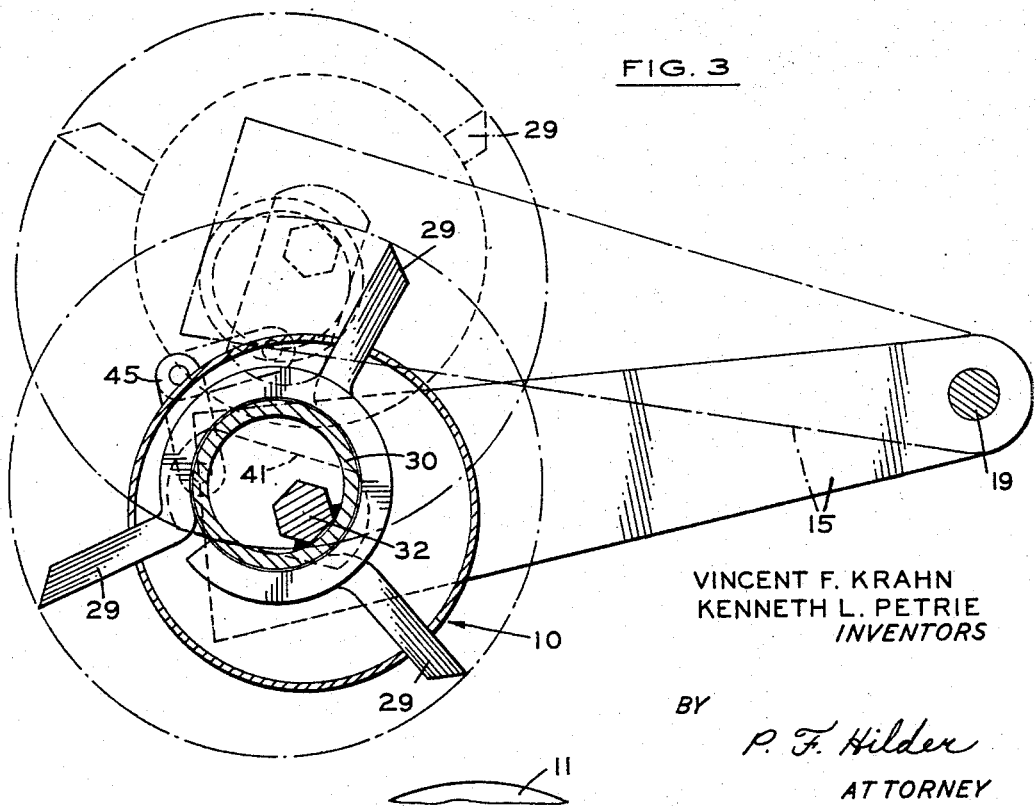
VINCENT F. KRAHN
KENNETH L. PETRIE
INVENTORS
BY
P. F. Hilder
ATTORNEY

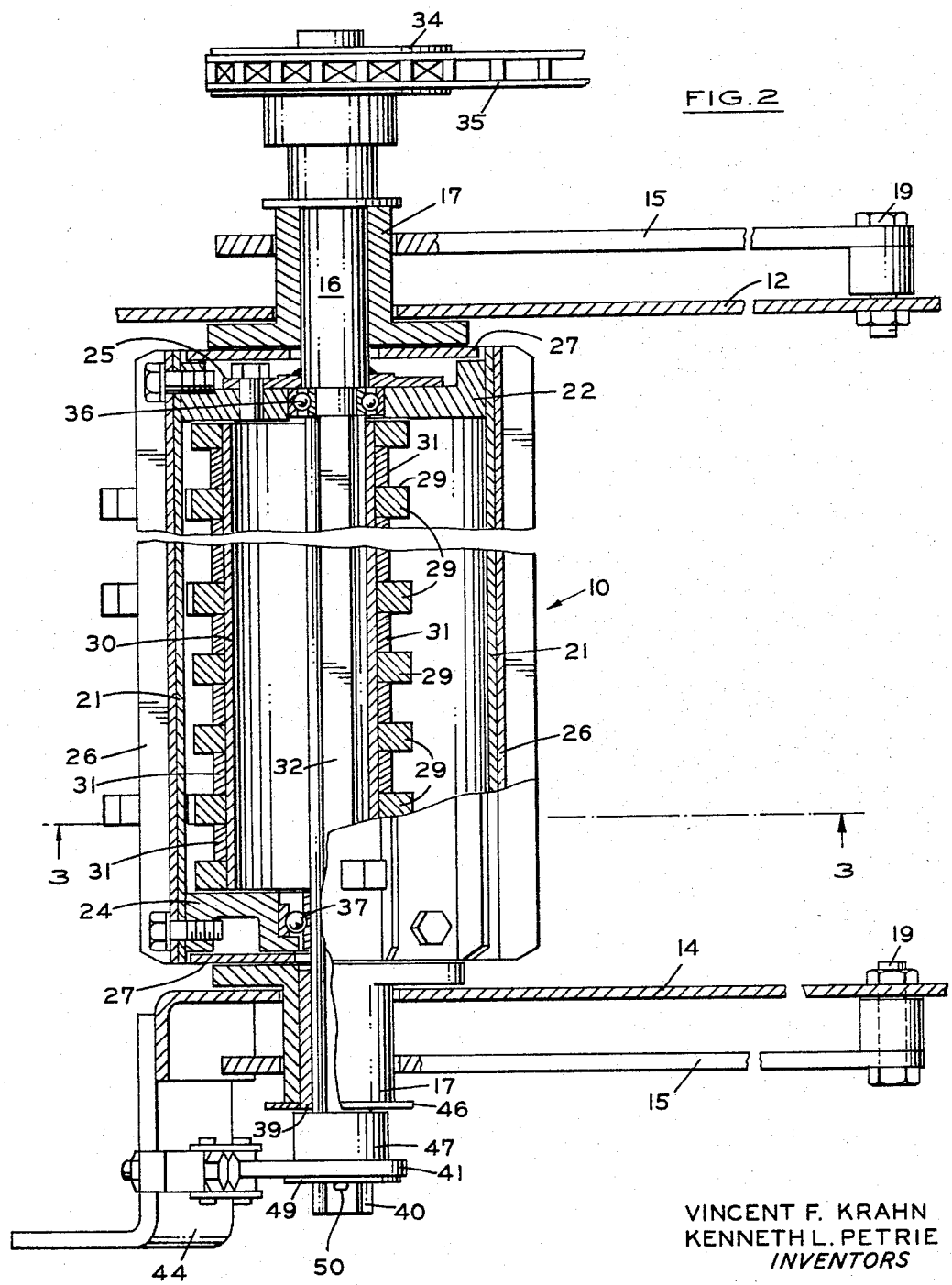

United States Patent Office 3,279,589
Patented Oct. 18, 1966

3,279,589
FORAGE HARVESTER
Vincent F. Krahn, Birmingham, and Kenneth L. Petrie, Royal Oak, Mich., assignors to Ford Motor Company, Dearborn, Mich., a corporation of Delaware
Filed Oct. 20, 1964, Ser. No. 405,204
4 Claims. (Cl. 198—211)

This invention relates to forage harvesters and more particularly to a feed roll construction therefor.

Forage harvesters often are provided with a pair of opposed feed rolls between which the crop, which already has been severed from the ground, is passed. The feed rolls serve to feed the crop to the shear bar and knives for chopping. Such a machine is shown in Krahn United States Patent 3,023,560 of March 6, 1962.

It is desirable for dependable, uniform flow of the crop to the shear bar that at least one of the rolls aggressively grip the crop to prevent slippage. In the above-mentioned patent, the upper feed roll is provided with longitudinal ribs to better grip the crop.

In the present invention, which is in some respects an improvement on the construction shown in that patent, the upper feed roll is provided with a series of generally radially extending fingers which project beyond the periphery of the roll during at least a portion of its rotation to grip the crop and progress it between the rolls. A feature of the present invention is the provision of mechanism whereby the zone of maximum extension of the fingers of one roll is moved towards the other roll as the rolls are separated by a larger volume of crop between the rolls and moved away from the other roll as the rolls approach one another due to lesser volume of crop.

This arrangement provides the aggressiveness of the retractable fingers while at the same time preventing any mechanical interference between the retractable fingers and the opposing roll.

Among the objects of the present invention are to provide an improved feed roll construction for forage harvesters in which retractable fingers contained within one of the rolls are automatically adjusted in accordance with volume of crop; to provide such a construction in which the zone of maximum extension of the retractable fingers is changed angularly as the rolls are moved apart by the crop; and generally to improve on forage harvester feed roll constructions of the type described.

Other objects, and objects relating to details of construction and operation will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is an end elevation of the upper forage harvester feed roll, associated parts for shifting the axis of the retractable fingers being shown in vertical section of elevation, and a portion of the lower roll and of the support for the upper feed roll being indicated.

FIGURE 2 is a horizontal section taken generally axially of the upper feed roll and associated supporting and driving parts of FIGURE 1.

FIGURE 3 is a vertical section of the upper feed roll taken generally along the line 3—3 of FIGURE 2.

The present invention is directed to an improvement in forage harvester feed rolls of the type in which the crop is passed between two opposed rolls and then across a shear bar, the crop being chopped by a series of knives on a reel-type cutter cooperating with the shear bar. A forage harvester of this type is shown in Krahn United States Patent 3,023,560 referred to above, and the present invention is shown applied to the feed roll structure of this forage harvester.

Referring now to the drawings, the forage harvester of the present invention includes a pair of feed rolls 10 and 11 which are rotatably mounted between a pair of vertical side walls 12 and 14 forming a combined frame and housing for the forage harvester. A feed roll 11 is mounted for rotation within the housing on a fixed axis, not shown, while the feed roll 10 is supported by a pair of radial arms 15 for generally vertical movement towards and away from the opposed, fixed feed roll 11. The feed roll 10 may be biased towards the roll 11 either by springs, not shown, or by gravity.

The feed roll 10 is provided with a hollow, axial shaft 16 extending from the drive end of the roll and received within a bearing journal 17 carried by the free end of one of the radial arms 15. The opposite end of each radial arm 15 is pivotally mounted to one of the said walls 12 by bolt 19 and an arcuate slot 20 formed in each of the side walls 12 and 14 permits limited vertical movement of the feed roll.

The feed roll 10 has a cylindrical wall portion formed of three similar arcuate sections 21 of 120° extent which extend between and are bolted to a pair of circular end plates 22 and 24. The roll is driven from the shaft 16 by a collar 25 bolted to the end plate 22 and secured to the shaft 16 by welding or otherwise. A series of longitudinally extending channels 26 are bolted at intervals about the feed roll 10 to provide some aggressiveness for gripping the crop passing between the rolls. A spacer or washer 27 is located between the bearing journal 17 and the end plates 22 and 24 at the end of the roll.

A series of retractable fingers 29 are carried within the roll 10, the retractable fingers may consist of three rows of four fingers each extending generally radially through the arcuate sections 21 of the roll, the rows being at 120° intervals. The inner end of each finger surrounds and rotates about the axis formed by a pipe or tube 30, the axis of the tube being parallel to but radially displaced from the axis of the roll. The arrangement is such that rotation of the feed roll 10 drives the retractable fingers, rotating them about their axis on the tube 30. Inasmuch as the tube 30 is eccentric to the axis of rotation of the roll, the fingers will be at maximum and minimum extended positions at an angular interval of 180°, and between those two locations will be in partially retracted or partially extended position. Preferably, circular collars 31 carried on the tube 30 serve as spacers between adjacent fingers 29.

The tube 30 is eccentrically mounted on a rod 32 extending axially of the roll 10 and coaxial with the shaft 16. Preferably, the rod 32 is noncircular in cross-section and is welded to the inside surface of the pipe 30. The rod 32 and the end plates 22 and 24 of the feed roll are relatively rotated, the rod remaining more or less stationary while the feed roll is rotated by a drive including a sprocket 34 mounted on the outer end of the shaft 16 and driven by a chain 35. Limited rotation of the rod 32 serves to circumferentially displace the tube 30 and thus to shift the zone of maximum extension of the retractable fingers 29. The bearing 36 rotatably mounts one end of the rod 32 in the feed roll end plate 22.

The other end of the feed roll 10 is rotatably carried by a bearing 37 between the end plate 24 and the rod 32. The end of the rod 32 projecting from the feed roll 10 is received within a bushing 39 rotatably received within the surrounding bearing journal 17, which in turn is carried by the adjacent arm 15. A second spacer or washer 27 is interposed between the end plate 24 of the roll and the bearing journal 17.

The end 40 of the rod 32 projects beyond the bearing journal 17 and a radially projecting lever 41 is non-rotatably connected with the rod. The lever 41 (see FIGURE 1) is connected to an abutment 42 fixed to a bracket 44 mounted on the side wall 14 of the forage harvester. This connection preferably comprises a link 45 pivotally connected between the abutment and the lever.

If desired, a washer 46 and spacer 47 may be placed on the rod 32 between the bushing 39 and lever 41. Preferably, a second washer 49 and cotter pin 50 retain the lever 41 on the rod.

When no crop is passing between the feed rolls 10 and 11, the feed roll 10 is at its lowest position, the path of the legs of the channels 26 clearing the feed roll 11 by a short distance. The tube 30 is so positioned by the rod 32 that the ends of the retractable fingers follow in the circular path indicated in FIGURE 1 in which the outer ends of the fingers are slightly spaced from the lower feed roll 11. As a greater volume of crop passes between the feed rolls, forming a thicker layer, the upper feed roll is raised against its bias, moving upwardly along the arc defined by the arms 15 as a radius. At the same time, the lever 41, which is linked to the abutment 42, is raised along with the roll and rotates the rod 32 counterclockwise as viewed in FIGURES 1 and 3 so as to rotate the tube 30 about the axis of the roll and angularly change the zone of maximum extension of the fingers 29. FIGURE 3 indicates by full line the position of the roll and orbit of the fingers at lowest position of the feed roll 10, and by broken line indicates position of these parts at highest position of the roll. The arrangement is such that the zone of maximum extension of the retractable fingers 29 is rotated counterclockwise towards the opposing feed roll 11 upon the feed roll 10 rising so as to provide additional aggressiveness of the feed roll 10 to feed a heavier crop. Conversely, as the volume of crop passing between the rolls diminishes, the feed roll 10 will drop and the tube 30, serving as the axis of the retractable fingers 29, will be rotated clockwise so as to shift the zone of maximum extension of the retractable fingers clockwise and away from the lower feed roll 11. This arrangement prevents any mechanical interference between the fingers and the lower feed roll 11.

We claim:

1. In a forage harvester, a pair of opposed feed rolls between which crop is fed, one of the feed rolls having rows of retractable fingers at angular intervals about the roll, the fingers being carried on an axis offset from the axis of the roll, means mounting at least one of the feed rolls for movement towards and away from the other roll, and means responsive to displacement of said feed roll for angularly displacing the axis of the retractable fingers.

2. In a forage harvester, a pair of opposed feed rolls between which crop is fed, one of the feed rolls having rows of retractable fingers at angular intervals about the roll, the fingers being carried on an axis offset from the axis of the roll, means mounting at least one of the feed rolls for movement towards and away from the other roll, and means responsive to displacement of said feed roll away from the other roll for angularly displacing the axis of the retractable fingers to move the zone of maximum extent of said fingers closer to the opposing roll.

3. In a forage harvester, a frame, a pair of opposed feed rolls carried by the frame and between which crop is fed, one of the feed rolls having a generally cylindrical surface, having journals coaxial with the cylindrical surface forming an axis for rotation of the feed roll and having rows of retractable fingers projecting beyond the cylindrical surface at intervals about the roll. The fingers being carried on an axis offset from the axis of the roll, means mounting said one roll for movement towards and away from the other roll, means, including a member projecting coaxially from the feed roll and a lever radially projecting from the end of said member adjacent an end of the roll, for displacing the axis of the retractable fingers, and means connecting the outer end of said lever to the frame whereby displacement of the feed roll rotates said member to displace the axis of the retractable fingers.

4. In a forage harvester, a frame, a pair of opposed feed rolls carried by the frame and between which crop is fed, one of the feed rolls having a generally cylindrical surface, having journals coaxial with the cylindrical surface forming an axis for rotation of the feed roll and having rows of retractable fingers projecing beyond the cylindrical surface at angular intervals about the roll. The fingers being carried on an axis offset from the axis of the roll, means mounting said one roll for movement towards and away from the other roll, and means, including a member projecting coaxially from the feed roll and a lever radially projecting from the end of said member adjacent an end of the roll for displacing the axis of the retractable fingers, and means connecting the outer end of said lever to the frame whereby displacement of said one roll away from the other roll rotates said member to angularly displace the axis of the retractable fingers in a direction to cause the zone of maximum projection of the fingers to move towards the opposing roll.

References Cited by the Examiner

UNITED STATES PATENTS 2,696,290  12/1954  Carroll _____ 198—9 X
3,023,560  3/1962  Krahn et al. _____ 56—23

EVON C. BLUNK, *Primary Examiner.*

R. J. HICKEY, *Assistant Examiner.*